W. H. Blake.
Sleeve Button.
No. 97,156. Patented Nov. 23, 1869.
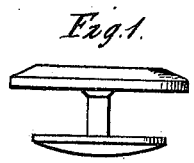
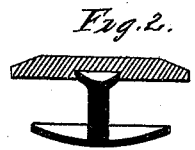
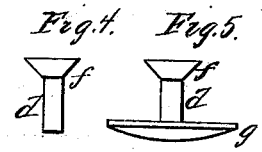
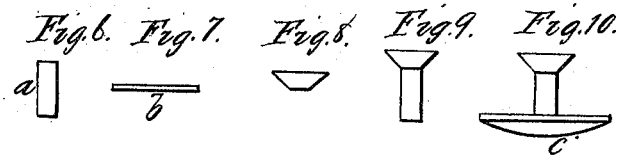
Witnesses
D. H. Shumway
A. J. Tibbitts
Inventor
William H. Blake
Attorney
John E. Earl

United States Patent Office.

WILLIAM H. BLAKE, OF WATERBURY, CONNECTICUT.

Letters Patent No. 97,156, dated November 23, 1869.

IMPROVED METHOD OF FORMING SLEEVE-BUTTON SHANKS.

The Schedule referred to in these Letters Patent and making part of the same

*To all whom it may concern:*

Be it known that I, WILLIAM H. BLAKE, of Waterbury, in the county of New Haven, and State of Connecticut, have invented a new Improvement in the Method of Forming Button-Shanks; and I hereby declare the following, when taken in connection with the accompanying drawings, and letters of reference marked thereon, to be a full, clear, and exact description of the same, and which said drawings constitute part of this specification, and represent, in—

Figure 1, a side view of a button complete;
Figure 2, a central section of the same;
Figures 3, 4, and 5, my improved method; and in
Figures 6, 7, 8, 9, 10, the old method.

This invention relates to an improvement in the method of forming a cup-shaped disk on the shank of buttons, by means of which the shank is attached to the button; and before proceeding to a description of my improvement, I first describe the method as heretofore practised.

First, for the shank $a$, wires are cut to the proper length, as seen in fig. 6. Then, from sheet-metal, a disk, $b$, is cut, as seen in fig. 7. This disk is struck into cup-shape, as denoted in fig. 8, and the cup is soldered or brazed on to the shank, as seen in fig. 9. Then the other end of the shank is soldered to a disk, $c$, of metal, as seen in fig. 10, the last-named disk forming the back of sleeve-button, or stud, as the case may be. The cup-shaped disk forms a means for connecting the shank to the button proper, and this is done by forming a recess in the button, as seen in fig. 2, and setting the cup-shaped disk into the said recess, and spinning or striking it down into the recess, as seen in fig. 2. By this method, it will be seen that there are four operations for the formation of the shank and cup-shaped disk, and also that it is very difficult to attach the cup-shaped disk to the shank, so as to be true and central thereon, and that it must require first-class workmen, and many of the cup-shaped disks are very imperfectly attached at that—difficulties which, by my invention, are entirely avoided; and My method consists in forming the cup-shaped disk on and as a part of the shank, in one and the same piece of metal.

I take wire of the requisite size and length, and upset a disk, $e$, thereon, as seen in fig. 3, and this is done in similar manner as for heading rivets, thus forming a flat disk, $e$, on the shank $d$, the disk $e$ being of the required size to form the cup on the shank. Then, in suitable dies, the disk $e$ is struck into cup-form $f$, as seen in fig. 4.

Thus, instead of four operations, shown in figs. 6, 7, 8, and 9, by the old method of forming the shank, I produce the same, or a very much better and cheaper article, by three operations, as seen in figs. 3 and 4.

My improved shank is attached to the button, and to the back, if desired, in the usual manner.

I claim, as my invention—

The improved method, herein described, of forming the shank $d$, with its cup-shaped disk $f$, in one and the same piece of metal.

WILLIAM H. BLAKE.

Witnesses:
A. J. TIBBITS,
MICHAEL RYAN.